(12) United States Patent
Heelan

(10) Patent No.: US 10,461,523 B2
(45) Date of Patent: Oct. 29, 2019

(54) ELECTROMAGNETIC STREAMER SAFETY

(71) Applicant: PGS Geophysical AS, Oslo (NO)

(72) Inventor: Philip Heelan, Asker (NO)

(73) Assignee: PGS Geophysical AS, Oslo (NO)

( * ) Notice: Subject to any disclaimer, the term of this patent is extended or adjusted under 35 U.S.C. 154(b) by 291 days.

(21) Appl. No.: 15/464,494

(22) Filed: Mar. 21, 2017

(65) Prior Publication Data
US 2017/0302070 A1    Oct. 19, 2017

Related U.S. Application Data

(60) Provisional application No. 62/324,420, filed on Apr. 19, 2016.

(51) Int. Cl.
*H02H 7/20* (2006.01)
*H02H 3/16* (2006.01)
*G01V 3/08* (2006.01)
*H02H 3/33* (2006.01)
*H02H 3/44* (2006.01)

(52) U.S. Cl.
CPC ............... *H02H 7/20* (2013.01); *G01V 3/083* (2013.01); *H02H 3/16* (2013.01); *H02H 3/167* (2013.01); *H02H 3/33* (2013.01); *H02H 3/445* (2013.01)

(58) Field of Classification Search
CPC ........... H02H 3/16; H02H 3/33; H02H 3/445; H02H 3/167; H02H 7/20; G01V 3/083
USPC .......................................................... 361/91.2
See application file for complete search history.

(56) References Cited

U.S. PATENT DOCUMENTS

| 2003/0169544 A1* | 9/2003 | Langford | ............. | H02H 1/0015 |
| | | | | 361/42 |
| 2006/0056118 A1* | 3/2006 | Huczko | ................ | H02H 1/0015 |
| | | | | 361/6 |
| 2008/0008030 A1* | 1/2008 | Pettersen | ................. | G01V 1/16 |
| | | | | 367/14 |
| 2016/0033662 A1* | 2/2016 | Busnoult | .............. | G01V 1/3826 |
| | | | | 700/90 |

* cited by examiner

*Primary Examiner* — Kevin J Comber

(57) ABSTRACT

Techniques are disclosed relating to electrical safety systems that may be useful, for example, in electromagnetic geophysical prospecting. Electromagnetic streamer systems often include a number of electrical loads in series that are powered by a constant-current power supply unit. Known techniques for detecting electrical faults have various drawbacks in such an arrangement. Embodiments of this disclosure may be used to mitigate some or all of such drawbacks.

28 Claims, 13 Drawing Sheets

ELECTROMAGNETIC STREAMER SAFETY

CROSS-REFERENCE TO RELATED APPLICATIONS

This application claims priority to U.S. Provisional Patent Application No. 62/324,420, filed on Apr. 19, 2016, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic (EM) geophysical surveys, as another example, are based on the use of EM fields. In some surveys, a survey vessel may tow one or more sources (e.g., air guns, marine vibrators, electromagnetic sources, etc.) and one or more streamers (e.g., seismic streamers or electromagnetic streamers) along which a number of sensors (e.g., hydrophones and/or geophones and/or EM sensors) are located.

In the example of EM surveying, EM fields generated by an electronic source such as a dipole source may be transmitted through the water and into the earth's crust, and then reflected back and captured at the towed sensors along the streamers to detect resistive features or anomalies. Data collected during a marine geophysical survey may be analyzed to locate hydrocarbon-bearing geological structures, and thus determine where deposits of oil and natural gas may be located.

Various safety issues involving electrical faults may arise in the use of streamers such as EM streamers. Embodiments of this disclosure may be used to address some of such safety issues, as discussed below.

DETAILED DESCRIPTION

Figure 1:
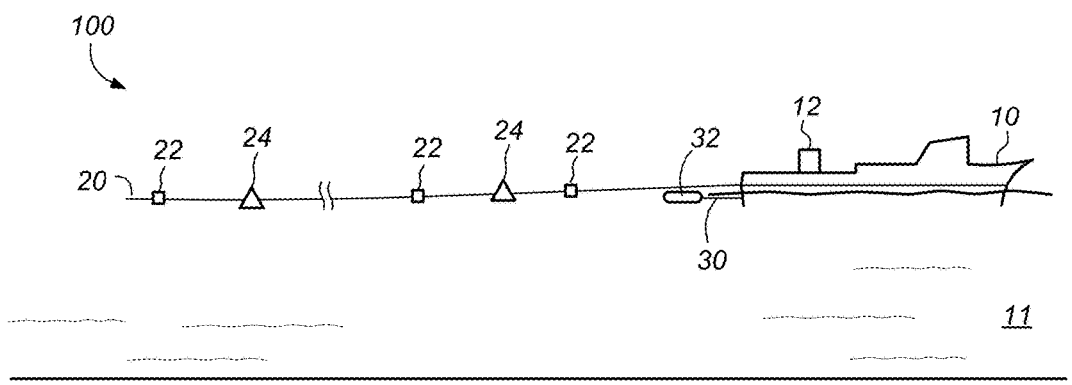
FIG. 1 shows an embodiment of a marine geophysical survey.

This disclosure initially describes, with reference to FIG. 1, an overview of an EM survey system. It then describes example safety apparatuses, systems, and methods with reference to FIGS. 2-18. Finally, an example computing system is described with reference to FIG. 19.

Survey Overview

Referring to FIG. 1, one embodiment of a geophysical survey system 100 is shown (not necessarily to scale). System 100 includes survey vessel 10, one or more EM sources 32, one or more EM source cables 30, and one or more streamers 20. Survey vessel 10 may be configured to move along a surface of body of water 11 such as a lake or ocean. In the illustrated embodiment, survey vessel 10 tows streamer 20 and EM source 32. In other embodiments, streamer 20 may be towed by a separate vessel (not shown), rather than survey vessel 10 that tows EM source 32. One of ordinary skill in the art with the benefit of this disclosure will understand that in various embodiments, a geophysical survey system may include any appropriate number of EM sources 32 and streamers 20.

EM source 32 may operate by providing a high-current output between dipoles, in some embodiments. Streamer 20 may include sensors 22 (e.g., electromagnetic sensors, etc.). Streamers 20 may further include streamer steering devices 24 (also referred to as "birds") which may provide selected lateral and/or vertical forces to streamer 20 as it is towed through the water, typically based on wings or hydrofoils that provide hydrodynamic lift. EM source 32 may also in some embodiments include a steering device for lateral and/or vertical position control. Streamer 20 may further include a tail buoy (not shown) at its back end.

Survey vessel 10 may include equipment, shown generally at 12 and for convenience collectively referred to as a "recording system." Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of survey vessel 10, EM source 32, streamer 20, sensors 22, etc.

Geodetic position (or "position") of the various elements of system 100 may be determined using various devices, including navigation equipment such as relative acoustic ranging units and/or global navigation satellite systems, e.g., a global positioning system ("GPS").

Example Embodiments

As noted above, various safety issues may arise in the use of streamers such as EM streamers. Individuals may be exposed to potentially unsafe or even lethal amounts of voltage and/or current when handling such streamers, and so it is desirable to implement a system that can quickly power down in the event of an electrical fault such as a ground fault.

Various types of power architectures may be used in different embodiments of EM streamers. For example, a constant-voltage power supply unit (PSU) may be used with a single load or with multiple loads. Likewise, a constant-current PSU may be used with a single load or with multiple loads. In each case, the PSU may be either grounded or isolated from ground; further, in each case of multiple loads, the loads may be arranged either in parallel or in series. Existing ground-fault interrupter (GFI) solutions may be used in some of these situations, but as will be discussed below, they may not provide sufficient protection in all circumstances. This disclosure aims to provide GFI-type functionality that is usable in circumstances in which existing solutions are insufficient.

In general, at least four factors are believed to influence the dangerousness of an electrical shock to a human: the frequency, the magnitude of the current through the body, the path of current through the body, and the duration of the exposure. The human body is highly sensitive to AC mains (50-60 Hz), with lethal current (causing fibrillation) in the range of 30 mA. As the frequency increases, tolerance typically improves. Different results are also typically obtained for men vs. women. For purposes of estimating the severity of an electrical shock based on frequency and magnitude of current, the following table gives some general guidelines.

TABLE 1

| Bodily effect | Gender | DC | 60 Hz AC | 10 kHz AC |
|---|---|---|---|---|
| Slight sensation at | M | 1 mA | 0.4 mA | 7 mA |
| point(s) of contact | F | 0.6 mA | 0.3 mA | 5 mA |
| Threshold of bodily | M | 5.2 mA | 1.1 mA | 12 mA |
| perception | F | 3.5 mA | 0.7 mA | 8 mA |
| Pain, with voluntary | M | 62 mA | 9 mA | 55 mA |
| muscle control maintained | F | 41 mA | 6 mA | 37 mA |
| Pain, with loss of | M | 76 mA | 16 mA | 75 mA |
| voluntary muscle control | F | 51 mA | 10.5 mA | 50 mA |
| Severe pain, | M | 90 mA | 23 mA | 94 mA |
| difficulty breathing | F | 60 mA | 15 mA | 63 mA |
| Possible heart | M | 500 mA | 100 mA | N/A |
| fibrillation after 3 seconds | F | 500 mA | 100 mA | N/A |

As shown, DC current is typically considered less dangerous than AC. A human can typically withstand some 300-500 mA of DC current before fibrillation occurs, whereas much smaller amounts of AC can cause fibrillation.

For current path, an electrical shock through both hands is typically much worse than a single-hand touch, as a single-hand touch may prevent current from traveling through the heart.

Figure 2:
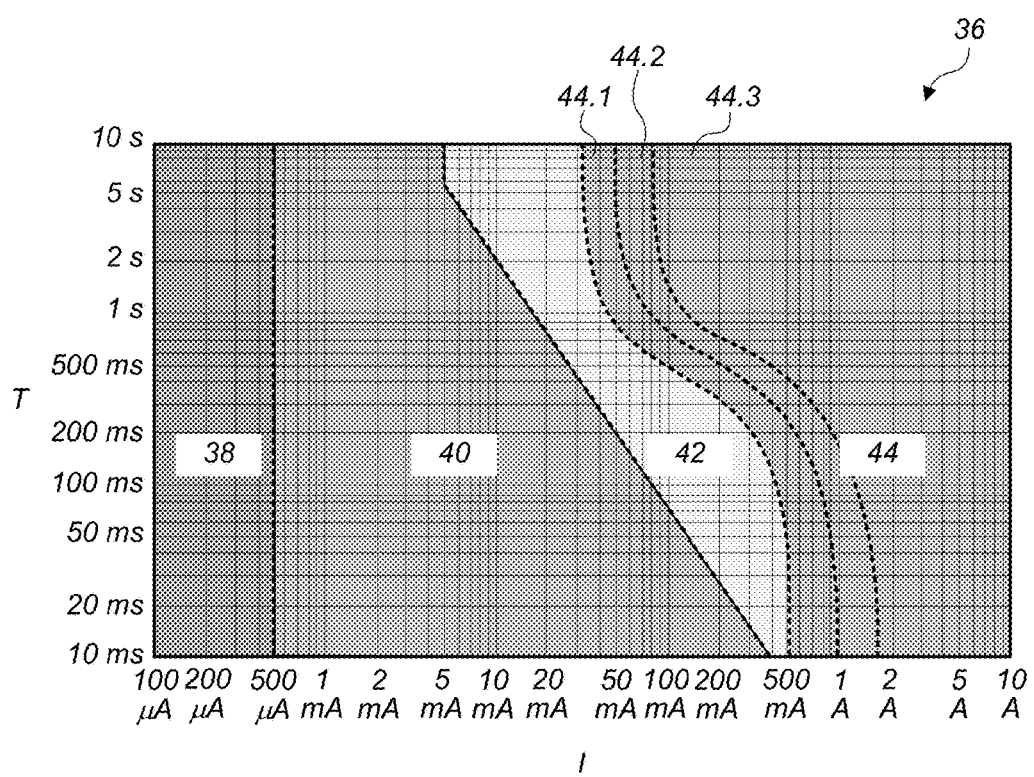
FIG. 2 shows a graph illustrating likely effects of electrical shock on a human.

Graph 36, shown in FIG. 2, is a log-log graph (adapted from https://en.wikipedia.org/wiki/Electric_shock) of the likely effect of alternating current of magnitude I and duration T passing from the left hand to the feet (as defined in IEC publication 60479-1), and is broken down into four large regions 38, 40, 42, and 44 of increasing severity. Region 44 is further broken down into smaller sub-regions 44.1, 44.2, and 44.3.

In region 38, the effect is imperceptible. In region 40, the effect is perceptible, but no muscle reactions are present. In region 42, muscle contractions are present, but the effects are reversible. In region 44, the possibility of irreversible effects is present. In particular, in sub-region 44.1, there is up to a 5% probability of ventricular fibrillation. In sub-region 44.2, there is a 5-50% probability of ventricular fibrillation. In sub-region 44.3, there is over a 50% chance of ventricular fibrillation.

With this general background on the likely effects of electric shock in mind, we turn now to a discussion of GFI devices (also referred to as residual-current devices or RCDs) in various scenarios. A GFI typically works by measuring the difference between supply and return current in an electrical circuit. If the difference is zero, then current out is the same as current returned, and therefore it is assumed that no electrical fault is present. If there is an imbalance, this is assumed to be indicative of a fault; in such a situation, a GFI will attempt to quickly disconnect the power supply.

Figure 3:
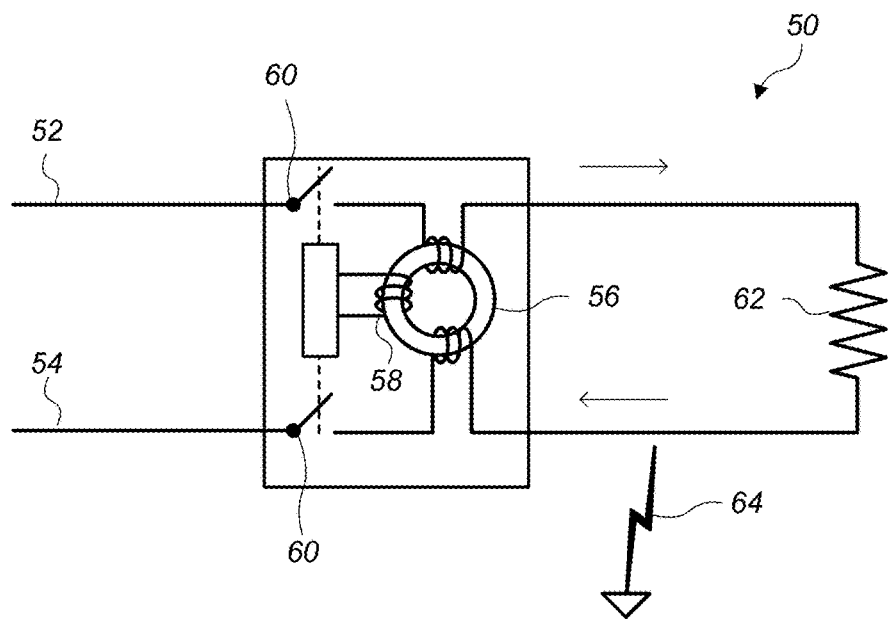
FIG. 3 shows an embodiment of GFI.

Turning now to FIG. 3, an example of a GFI device is shown as GFI 50, which is protecting a circuit that powers load 62. The current in live wire 52 and neutral wire 54 may be measured by wrapping each wire around the same toroid 56. As long as the windings are equal in number and opposite in direction, then each wire induces a magnetic field in toroid 56 such that the magnetic fields oppose each other. When the current in each wire is equal, the fields are also equal but opposite in magnitude, and they cancel each other out. When the currents in live wire 52 and neutral wire 54 are not equal (e.g., due to neutral-to-ground fault 64), the magnetic fields do not exactly cancel, and there is a net resultant field. Search coil 58 may be used to detect any such resultant field. If the net field exceeds a set level, one or more switches 60 may be opened to disconnect the circuit.

Figure 4:
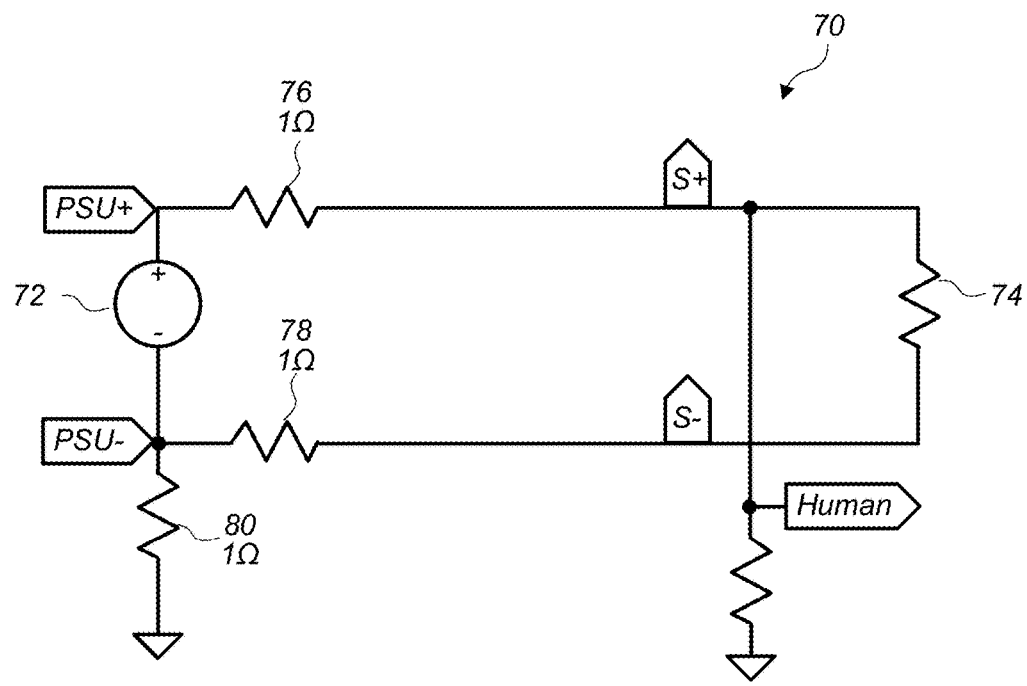
FIG. 4 shows an embodiment of a GFI with a grounded, constant-voltage PSU and a single load.

Turning now to FIG. 4, a schematic of a device is shown as GFI 70. Constant-voltage PSU 72 supplies power to load 74 and is grounded via resistor 80 (assumed to have a resistance of 1 ohm). In normal operation, the current flowing out of constant-voltage PSU 72's positive rail at PSU+ and the current flowing into the negative rail at PSU− should be equal, and so the voltage drop across resistors 76 and 78 (which have the same resistance) should be identical. (In this example, resistors 76 and 78 may be considered as schematically representing the toroid arrangement of FIG. 3, such that the GFI operates by measuring a current difference between resistors 76 and 78.) If different voltage drops are measured across resistors 76 and 78, it may be assumed that an electrical fault has occurred, and the circuit may be broken. In this example, constant-voltage PSU 72 supplies 400 volts DC, and resistors 76 and 78 each have a resistance of 1 ohm. A human is assumed to have a resistance of 1 k ohms to ground in this example. (For most of this disclosure, DC systems are discussed, and so the term "resistance" will be used rather than "impedance." One of ordinary skill in the art with the benefit of this disclosure will understand its application, mutatis mutandis, to AC systems.)

If a grounded human contacts a wire at location S+ as illustrated, a fault current of 400 mA will flow through the human to ground. This current can be quickly detected by the GFI, and power can be disconnected before serious harm occurs.

If the grounded human instead touches a wire at location S−, no current will flow through the human, and so the GFI will not measure any current difference between resistors 76 and 78, and will not disconnect the power. This is not considered a fault situation.

Figure 5:
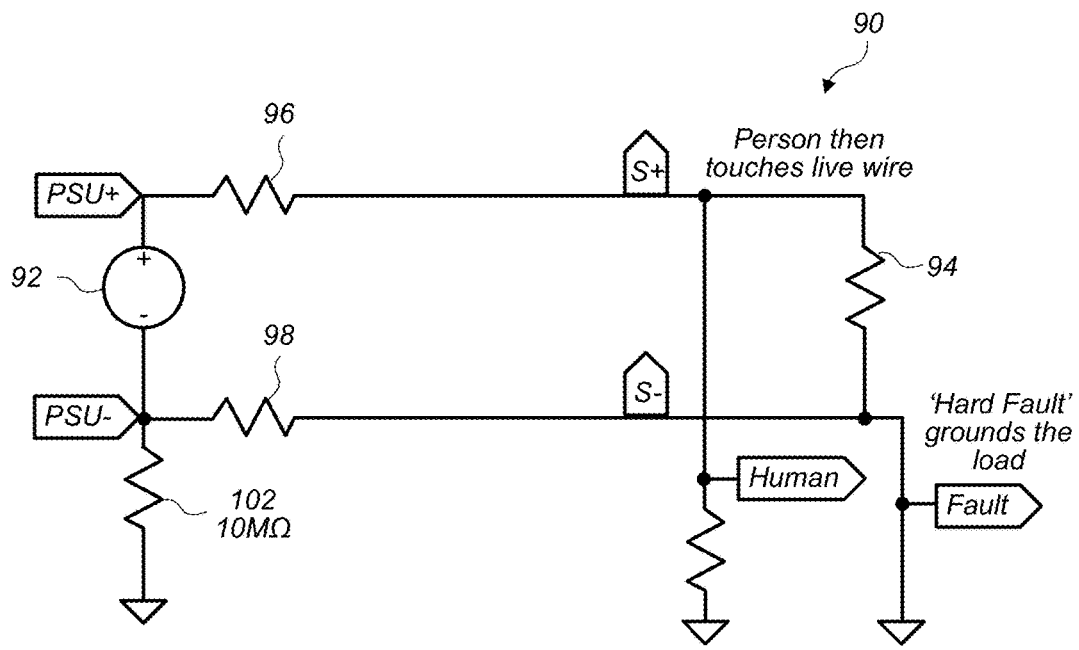
FIG. 5 shows an embodiment of a GFI with an isolated, constant-voltage PSU and a single load.

Turning now to FIG. 5, GFI 90 is shown with constant-voltage PSU 92 isolated from ground (or nearly isolated, as illustrated by resistor 102 having a resistance of 10 megohms). For purposes of this disclosure, the term "isolated" should be interpreted to include any element that has at most a high-resistance path (e.g., a 10 megohm path) to ground, as well as any element that is isolated from ground in any other known way as would be understood by one of ordinary skill in the art with the benefit of this disclosure. In this situation, a grounded person who touches any live output from isolated constant-voltage PSU 92 would not receive an electric shock because there is no electrical connection between ground (where the person is standing) and constant-voltage PSU 92 itself. Current thus cannot flow through the person and can only return via the PSU− rail.

However, if a hard ground fault occurs (e.g., if a live wire in load 94 comes in contact with ground, or if load 94 is intentionally grounded), then a person touching a live wire could get an electric shock. Further, this type of fault will not be detected by the GFI shown at resistors 96 and 98, because the human essentially is connected in parallel with resistor 94, such that current through resistors 96 and 98 remains equal. Table 2 below summarizes the possibilities for different hard ground fault positions and touch positions for a person.

TABLE 2

| Person Touch Position | Ground Fault Position | Person Current | GFI Useful | GFI Current | Notes |
|---|---|---|---|---|---|
| S+ or S− | None | 0 mA | N/A | 0 mA | No Fault |
| S+ | S+ | 0 mA | No | 0 mA | GFI will not detect fault. However, person is grounded, so no shock. |
| S+ | S− | 400 mA | No | 0 mA | GFI does not work, potentially lethal. |
| S− | S− | 0 mA | No | 0 mA | GFI will not detect fault. However, person is grounded, so no shock. |
| S− | S+ | 400 mA | No | 0 mA | GFI does not work, potentially lethal. |

Thus it can be seen that the standard GFI arrangement is not sufficient in the illustrated situation of an isolated, constant-voltage power supply with a single load.

Figure 6:
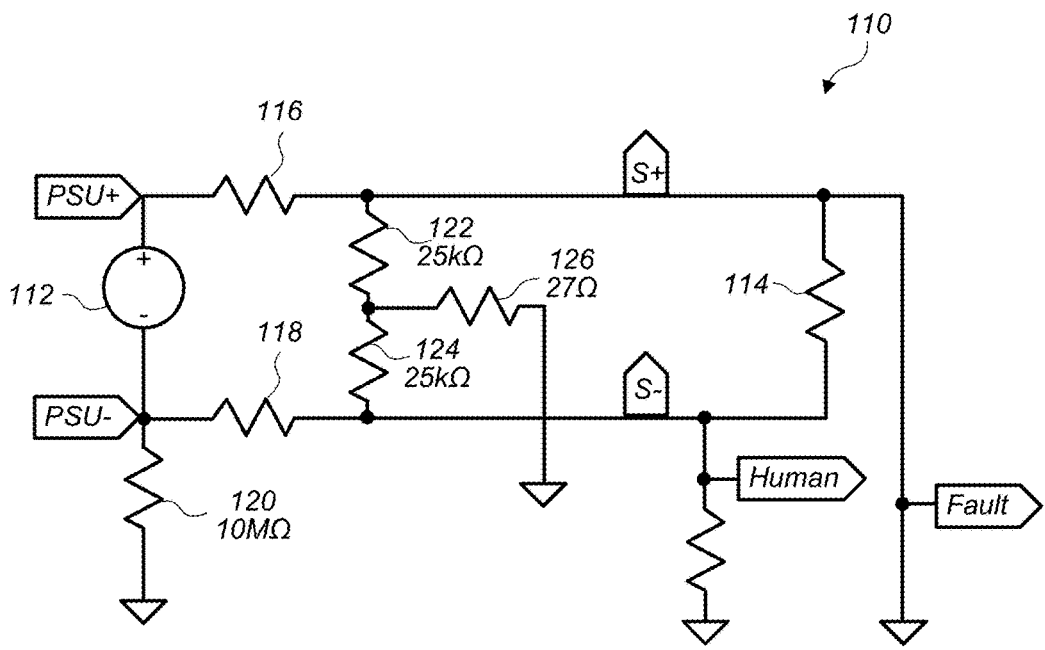
FIG. 6 shows an embodiment of a GFI with an isolated, constant-voltage PSU and a single isolated load.

Turning now to FIG. 6, a potential solution to the problems shown in FIG. 5 is presented. The arrangement of FIG. 6 shows GFI 110, in which isolated constant-voltage PSU 112 powers load 114. Compared to the embodiment of FIG. 5, resistors 116, 118, and 120 are similar to resistors 96, 98, and 102, respectively. A modified GFI is shown in this figure that is designed to work specifically with isolated power systems. This may be accomplished by adding a "virtual ground" via a resistor divider network as shown. In particular, resistors 122 and 124 act as a divider that sets a differential voltage output between ground such that S+=200V and S−=−200V relative to ground. In this normal operating state, there is no current flow through resistor 126 (which may be on the order of 20-30 ohms) because without a fault, there is no path for current to flow through resistor 126.

If a fault occurs on either side of the load, then resistor 126 will effectively be connected in parallel with either resister 122 or 124, and current will flow through resistor 126. A current flowing through resistor 126 (or a voltage drop across resistor 126) therefore indicates a ground fault.

From Table 3 below, we can see that this type of GFI can detect either a hard fault (a direct connection with ground) or a human touch, or both. (It is noted that if load 114 is purposely grounded, GFI 110 will detect a fault. Accordingly, for the system to operate properly as illustrated, both constant-voltage PSU 112 and load 114 are designed to be isolated from ground.)

TABLE 3

| Person Touch Position | Ground Fault Position | Person Current | GFI Useful | GFI Current | Notes |
|---|---|---|---|---|---|
| S+ or S− | No Fault | 15 mA | Yes | 15 mA | GFI works |
| S+ | S+ | 0 mA | Yes | 15 mA | GFI works |
| S+ | S− | 400 mA | Yes | 15 mA | GFI works |
| S− | S− | 15 mA | Yes | 15 mA | GFI works |
| S− | S+ | 400 mA | Yes | 15 mA | GFI works |
| No Touch | S+ or S− | 0 mA | Yes | 15 mA | GFI works |

The illustrated GFI with a virtual ground thus does work adequately for an isolated DC system using a constant-voltage PSU powering a single load. However, it is noted that the GFI current vs human current is in proportion to the resistance of resistor 126 vs the human resistance, in this case 25:1. This is why 400 mA through a human will in this embodiment result in 15 mA through the GFI as measured at resistor 126.

Figure 7:
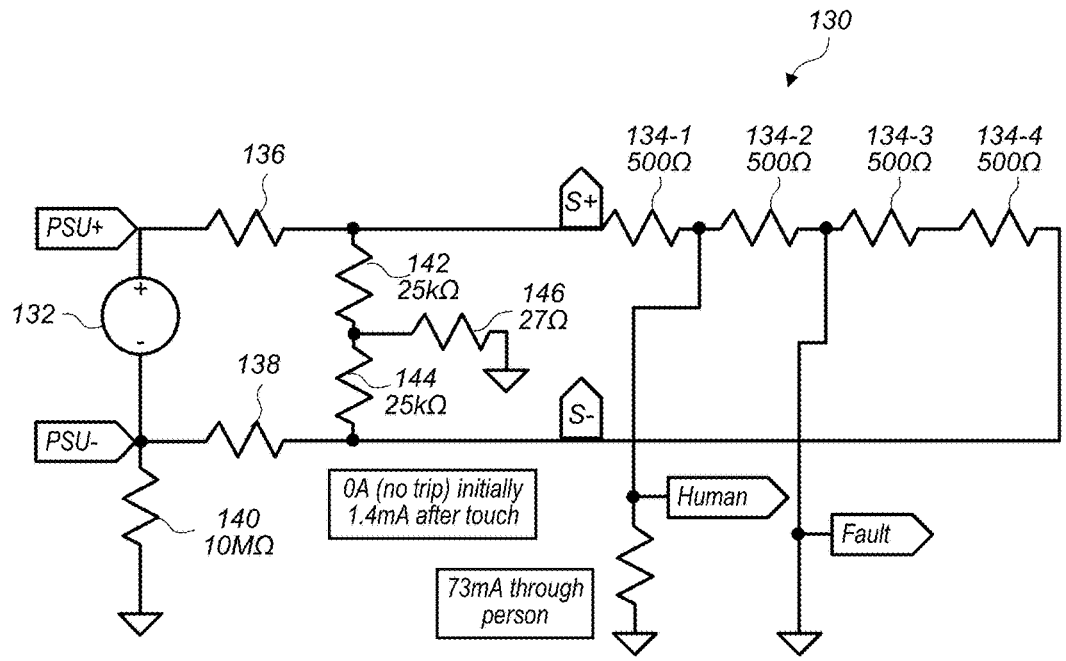
FIG. 7 shows an embodiment of a GFI with an isolated, constant-voltage PSU and multiple isolated loads in series.

It is also noted that a similar arrangement but with load 114 replaced by multiple loads in parallel is also possible. In such a setup, GFI 110 also works adequately, functioning in essentially the same way as shown in FIG. 6. As shown in FIG. 7, however, there are situations in which GFI 110 would not work adequately.

Turning now to FIG. 7, an embodiment is shown in which GFI 130 (similar to GFI 110 from FIG. 6) is applied to multiple isolated loads in series. In this arrangement, the GFI does not perform adequately. As shown, PSU 132 powers a plurality of series loads 134-1, 134-2, 134-3, and 134-4.

As shown, the four loads are connected in series such that 100V is present across each load (assuming the loads have a common resistance). If a hard ground fault occurs at the midpoint of the loads as shown, GFI 130 with virtual ground cannot detect it, because the voltage differential is maintained across resistors 142 and 144, and so no current flows through resistor 146.

That is, if a hard ground fault occurs at the load mid-point, GFI 130 cannot detect the fault, because voltage symmetry with respect to ground is maintained. S+ and S− are equal but opposite magnitude (+200V and −200V, respectively).

If a person then touches a live wire (for example, between load 134-1 and load 134-2 as shown), the GFI will still not trip. The GFI senses a differential current of only 1.4 mA between resistors 136 and 138, which is typically insufficient to cause the GFI to actuate. In many GFIs, the trip setting may have a lower limit of around 5 mA, because adjusting the setting down to 1 mA can cause false detections.

As shown, this arrangement puts a voltage of 73V between the person and ground, causing a current of some 73 mA to flow through the person. This is probably a non-fatal current at DC, but it would nonetheless be quite painful. Further, 73 mA may be above the "let go" level, such that the person might inadvertently grip onto the live wire and remain connected through a loss of voluntary muscle control.

All of the examples so far have used a constant-voltage PSU. In practice, however, some systems (e.g., some EM streamer systems) are implemented with a constant-current PSU. As will be described in more detail below, this introduces additional considerations.

Figure 8:
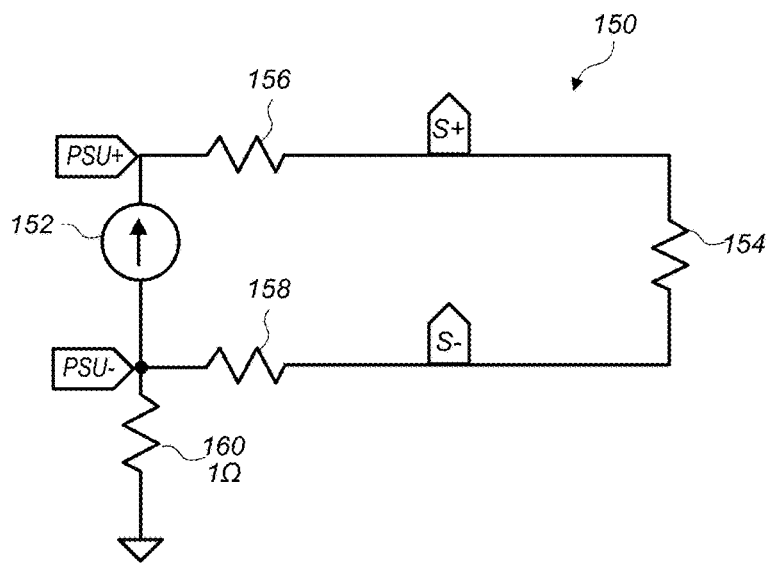
FIG. 8 shows an embodiment of a grounded, constant-current PSU.

Turning now to FIG. 8, circuit 150 is shown in which constant-current PSU 152 powers load 154 by maintaining a constant current output (to within set limits). That is, if load 154 varies in resistance, the power source's output voltage will adjust to maintain the set current. In this example, constant-current PSU 152 provides 400 mA of current, and load 154 provides a resistance of 1 k ohms. (Unless otherwise indicated, the examples that follow will also be based on a 400 mA constant-current PSU and a load resistance of 1 k ohms.) The voltage across the load is thus 400V. If the resistance of load 154 were to change to 500 ohms, the voltage supplied across the load by constant-current PSU 152 would drop to 200V. If the resistance of load 154 were to change to 100 ohms, the voltage across the load would drop to 40V, etc., with the current remaining the same in each case. One of ordinary skill in the art with the benefit of this disclosure will understand that this behavior as described is an idealization, and that real physical devices may deviate somewhat from the ideal. We will now examine specific constant-current embodiments and assess the effectiveness of GFI embodiments in each case.

Figure 9:
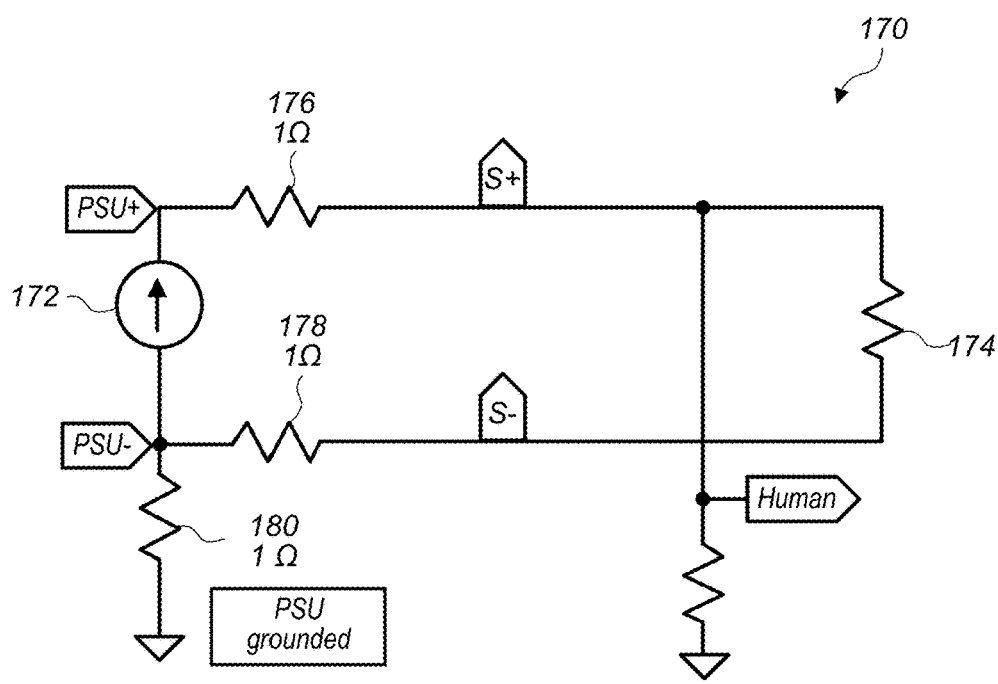
FIG. 9 shows an embodiment of a GFI with a grounded, constant-current PSU and a single load.

Turning now to FIG. 9, GFI 170 is shown in the case of grounded, constant-current PSU 172 powering load 174. Constant-current PSU 172 is set to provide 400 mA. GFI 170 is similar in operation to GFI 70 shown in FIG. 4, in that a difference in current between resistors 176 and 178 is measured (e.g., by measuring voltage drops), and if that current difference is greater than a threshold amount, power is cut. For this example, it is assumed that load 174 has approximately the same resistance as a human, 1 k ohms. If a grounded human touches a wire at S+, then 200 mA will flow through the human, and 200 mA will flow through load 174, and the fault will be detected. If a grounded human touches a wire at S−, no harm will be done because S− is already at ground potential. The possibilities are summarized in Table 4.

TABLE 4

| Person Touch Position | Person Current | GFI Useful | GFI Current | Notes |
|---|---|---|---|---|
| S+ | 200 mA | Yes | 200 mA | GFI works (very sensitive) |
| S− | 0 mA | Yes | 0 mA | No danger (person touching ground potential) |

Figure 10:
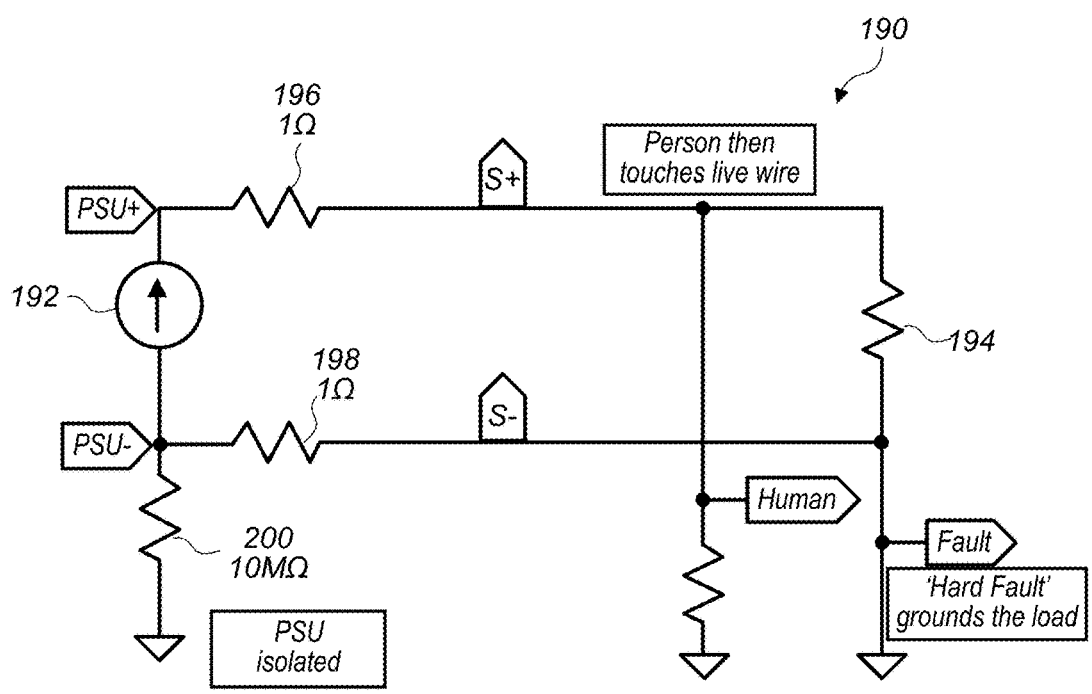
FIG. 10 shows an embodiment of a GFI with an isolated, constant-current PSU and a single load.

Turning now to FIG. 10, a situation similar to FIG. 5 is shown. In GFI 190, however, isolated constant-current PSU 192 (which supplies 400 mA) is shown in place of the isolated constant-voltage PSU shown in FIG. 5. As in the constant-voltage case, GFI 190 may not always provide sufficient protection.

Provided the circuit remains isolated, a person touching any live output from constant-current PSU 192 will not receive an electric shock, because there is no electrical connection between ground (where the person is standing) and the constant-current PSU 192. Accordingly, current cannot flow through the person; current can only return via PSU−.

If, however, a hard ground fault occurs as shown (e.g., a live wire in load 194 comes in contact with ground, or load 194 is intentionally grounded), then a person touching a live wire will get an electric shock. As the load and person have the same resistance, half of the supplied 400 mA will pass through each path (200 mA through the person, and 200 mA through the load). Note that the output voltage is now 200V (compared to the 400V supplied when there is no fault). GFI 190 cannot detect this, because the human is effectively connected in parallel with load 194. Table 5 demonstrates the possibilities.

TABLE 5

| Person Touch Position | Ground Fault Position | Person Current | GFI Useful | GFI Current | Notes |
|---|---|---|---|---|---|
| S+ or S− | No Fault | 0 mA | N/A | 0 mA | No fault |
| S+ | S+ | 0 mA | No | 0 mA | GFI will not detect fault; but both human and S+ are at ground potential |
| S+ | S− | 200 mA | No | 0 mA | GFI does not work, potentially lethal |
| S− | S− | 0 mA | No | 0 mA | GFI will not detect fault; but both human and S− are at ground potential |
| S− | S+ | 200 mA | No | 0 mA | GFI does not work, potentially lethal |

Figure 11:
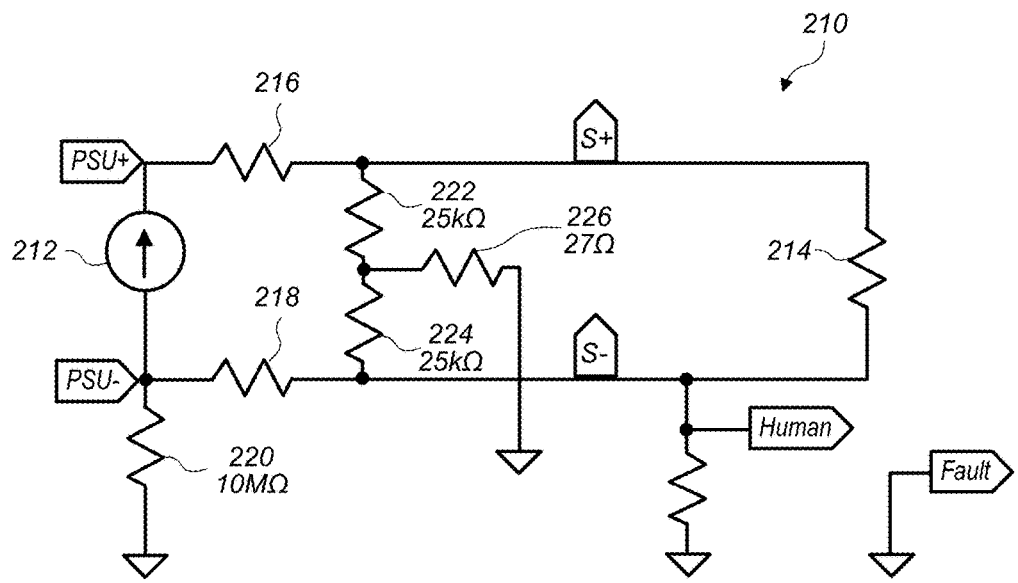
FIG. 11 shows an embodiment of a GFI with an isolated, constant-current PSU and a single isolated load.

Turning now to FIG. 11, one embodiment of a solution is shown which addresses some of the problems of FIG. 10. As shown, isolated constant-current PSU 212 powers load 214. As in the constant-voltage case, a resistor divider network is used to modify GFI 210 to include a "virtual ground." (Several fault scenarios are described with respect to Table 6 below; for ease of illustration, the fault location is not explicitly shown in FIG. 11, it being understood that it may vary according to the described scenarios.)

As shown, GFI 210 has a ground reference via a resistor divider that includes resistors 222 and 224. In the normal operating state, there is no current flow through resistor 226 (which may be on the order of 20-30 ohms), because absent a fault, there is no path for current to flow.

If a fault occurs on either side of load 214, the power output can no longer remain balanced—that is, the current flowing out of PSU+ and into PSU− will no longer be equal and opposite. There will be a path for current to flow through resistor 226 (via the human). A current flowing through resistor 226 (or a voltage drop across resistor 226) indicates a ground fault.

From Table 6 below, we can see that this type of GFI can detect either a hard fault (a direct connection with ground) or a human touch, or both. (It is noted that if load 214 is purposely grounded, GFI 210 will detect a fault. Accordingly, for the system to operate properly as illustrated, both constant-current PSU 212 and load 214 are designed to be isolated from ground.)

TABLE 6

| Person Touch Position | Ground Fault Position | Person Current | GFI Useful | GFI Current | PSU Voltage | Notes |
|---|---|---|---|---|---|---|
| S+ or S− | No Fault | 14 mA | Yes | 14 mA | 385 | GFI works |
| S+ | S+ | 15 mA | Yes | 0 mA | 385 | GFI works |
| S+ | S− | 200 mA | Yes (marginal) | 7.8 mA | 196 | GFI works (detection current low) |
| S− | S− | 0 mA | Yes | 15 mA | 385 | GFI works |
| S− | S+ | 200 mA | Yes (marginal) | 7.8 mA | 196 | GFI works (detection current low) |
| No Touch | S+ or S− | 0 mA | Yes | 15 mA | 385 | GFI works |

It is noted that although GFI 210 will work as shown, its behavior is different from the case of a constant-voltage PSU. For example:

When a fault occurs, the PSU output will shift to either PSU+=400V (if the fault touches S−) or PSU+=0V (if the fault touches S+). Note that the magnitude of the voltage does not change, just its reference with respect to ground. This voltage shift is detected by resistor 226.

When a person then touches a live circuit, the load resistance is suddenly cut in half because the 1 k ohm load 214 is in parallel with the 1 k ohm human. The total load resistance is now 500 ohms instead of 1 k ohms. But because the constant-current power supply maintains a 400 mA output, the output voltage must drop to 200V (from 400V). Because each load is equal, the current will divide equally between each load, with 200 mA through the person and 200 mA through the original load.

It should also be noted from the table above that the GFI detection current decreases with an increasing amount of current through the person. For example, if the person's resistance were very low, say 100 ohms, then 360 mA would pass through the person, and only about 1.4 mA would pass through the GFI. The GFI would likely not detect this lethal current.

Accordingly, GFI 210 cannot detect the magnitude of the current through the person, but can only detect the existence of an anomalous current. In order for this GFI system to calculate the current through the person, the person's resistance must also be known, which in practice it typically is not.

Finally, also note that an additional column has been added to Table 6 above. This column shows the voltage drop at the output of constant-current PSU 212 for each case. A single fault causes a voltage swing around ground reference, but it does not reduce the PSU voltage. An additional fault such as a person touching a live wire causing current to flow through the person will cause the PSU voltage to drop (and the PSU output power, given by $P=I^2R$, to correspondingly decrease). As can be seen, the more current that flows through the person, the bigger the voltage drop will be at the PSU. Further, the more current that flows through the person, the larger the decrease in PSU output power will be.

Accordingly, by detecting this voltage drop (or power drop) and/or by detecting the PSU voltage swing around a ground reference, some embodiments of this disclosure may provide enhanced safety.

Figure 12:
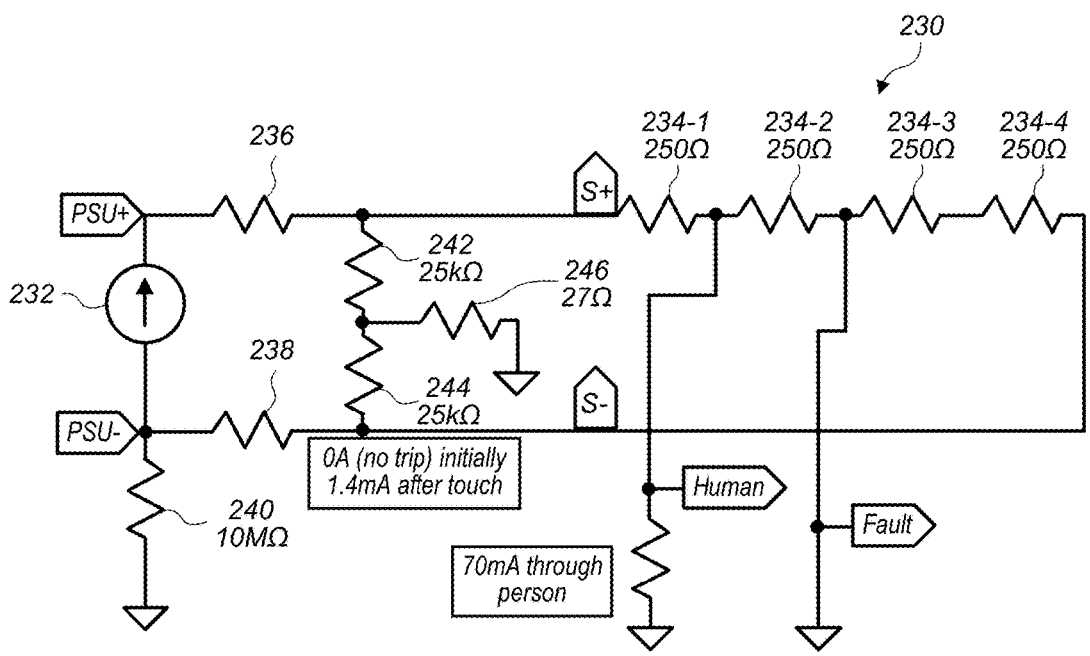
FIG. 12 shows an embodiment of a GFI with an isolated, constant-current PSU and multiple isolated loads in series.

Turning now to FIG. 12, another embodiment is shown as GFI 230. As shown, isolated constant-current PSU 232 powers a plurality of series loads 234-1, 234-2, 234-3, and 234-4. This arrangement corresponds to some embodiments of EM streamers, which may use a very low-noise constant-current PSU to power series loads, and may be isolated from ground to further reduce noise.

With four identical loads connected in series, if there is no fault we would expect to measure 100V across each load. If a hard fault occurs at the load mid-point (between load 234-2 and load 234-3), GFI 230 cannot detect this fault, as voltage symmetry with respect to ground is maintained. That is, S+ and S− are equal but opposite magnitude, and so an equal current flows through resistors 242 and 244, and no current flows through resistor 246 (which may be on the order of 20-30 ohms). Therefore, no fault is detected.

If a person now touches a live wire (e.g., between load 234-1 and load 234-2) GFI 230 will still not trip. GFI 230 senses a current differential of only 0.8 mA, which is generally too small a current to actuate a GFI. However, a 78V potential exists between the person and ground, and so 78 mA flows through the person.

This is probably a non-fatal current at DC, but it would nonetheless be quite painful. Further, 78 mA may be above the "let go" level, such that the person might inadvertently grip onto the live wire and remain connected through a loss of voluntary muscle control. Table 7 below summarizes the failures of GFI 230, and indicates a solution. The terms FP, MP, and AP in Table 7 refer respectively to a forward point, a midpoint, and an aft point on a streamer.

TABLE 7

| Person Touch Position | Ground Fault Position | Person Current | GFI Useful | GFI Current | PSU Voltage | S+ to GND (V) | Notes |
|---|---|---|---|---|---|---|---|
| No touch | None | 14 | N/A | 0 mA | 393 | 196 | No Fault |
| S+ | None | 7 | Yes | 14 | 386 | 14 | PSU Voltage drop & S+ is 14 V |
| FP | None | 0 | Marginal | 7 | 390 | 106 | GFI detection current low, alternative works |
| MP | None | 7 | N/A | 0 | 392 | 196 | Not detectable, but no adverse effect |
| AP | None | 14 | Marginal | 7 | 390 | 284 | GFI detection current low, alternative works |
| S− | None | 131 | Yes | 15 | 386 | 371 | GFI detection current low, alternative works |
| S+ | MP | 78 | No | 2.6 | 328 | 131 | GFI won't work, but alternative will |
| FP | MP | 0 | No | 0.8 | 373 | 176 | GFI won't work, but alternative will |
| MP | MP | 78 | N/A | 0 | 392 | 196 | Not detectable, but no adverse effect |
| AP | MP | 131 | No | .8 | 373 | 196 | GFI won't work, but alternative will |
| S− | MP | 168 | No | 2.6 | 328 | 196 | GFI won't work, but alternative will |

TABLE 7-continued

| Person Touch Position | Ground Fault Position | Person Current | GFI Useful | GFI Current | PSU Voltage | S+ to GND (V) | Notes |
|---|---|---|---|---|---|---|---|
| S+ | AP | 130 | No | 2.8 | 268 | 168 | GFI won't work, but alternative will |
| FP | AP | 78 | Marginal | 5 | 327 | 228 | GFI detection current low |
| MP | AP | 0 | Marginal | 6.8 | 372 | 272 | GFI detection current low |
| AP | AP | 80 | Marginal | 7.6 | 391 | 291 | GFI detection current low |
| S− | AP | 14 | Marginal | 8.4 | 371 | 291 | GFI detection current low |

The table above is a summary of various possible touch and fault positions. The table lists some of the more difficult cases for a GFI, where a traditional GFI will not detect a fault/shock (or at least may not detect the fault/shock, because current detection current is low). These traditional GFI examples are compared against measuring the constant-current PSU output voltage or output power directly, and the rail voltage with respect to a ground reference. As can be seen, the results based on measuring the constant-current PSU output voltage or output power directly and/or the rail voltage with respect to a ground reference show good sensitivity compared to a traditional GFI.

To summarize the various situations described above with respect to FIGS. 4-12, a traditional GFI can be made to work adequately with: (1) a constant-voltage PSU that is grounded attached to a single load, or isolated attached to a single isolated load, or grounded attached to multiple parallel loads, or isolated attached to multiple isolated parallel loads; or (2) a constant-current PSU that is grounded attached to a single load, or isolated attached to a single isolated load, or grounded attached to multiple parallel loads, or isolated attached to multiple isolated parallel loads.

However, a traditional GFI will not always work with: (1) a constant-voltage PSU that is grounded attached to multiple series loads, or isolated attached to multiple series parallel loads; or (2) a constant-current PSU that is grounded attached to multiple series loads, or isolated attached to multiple series parallel loads.

In the case of a constant-current PSU connected to multiple series loads, for example, some embodiments of this disclosure may overcome these deficiencies by taking into account one or both of the following.

Firstly, the voltage across the PSU output terminals may be measured directly to give an indication of the magnitude of the anomalous current to ground. In some embodiments, the output power of the PSU may be measured (e.g., by measuring voltage and current output, or by using built-in diagnostics hardware of the PSU). As long as the loads themselves are stable in the power that they draw, a larger voltage sag between the PSU output terminals (and/or a larger sag in PSU output power) is indicative of a larger fault.

Secondly, the PSU output voltage (e.g., the voltage at a particular one of the PSU's output terminals) may be measured with respect to a ground reference, which will detect a single-fault resistive path to ground. This may not always indicate significant current to ground, but it may in some instances be used to indicate the position of a fault (as described in more detail below).

By taking account of one or both of these measurements, embodiments of this disclosure may provide additional safety and functionality as compared with existing GFI solutions.

Figure 13:
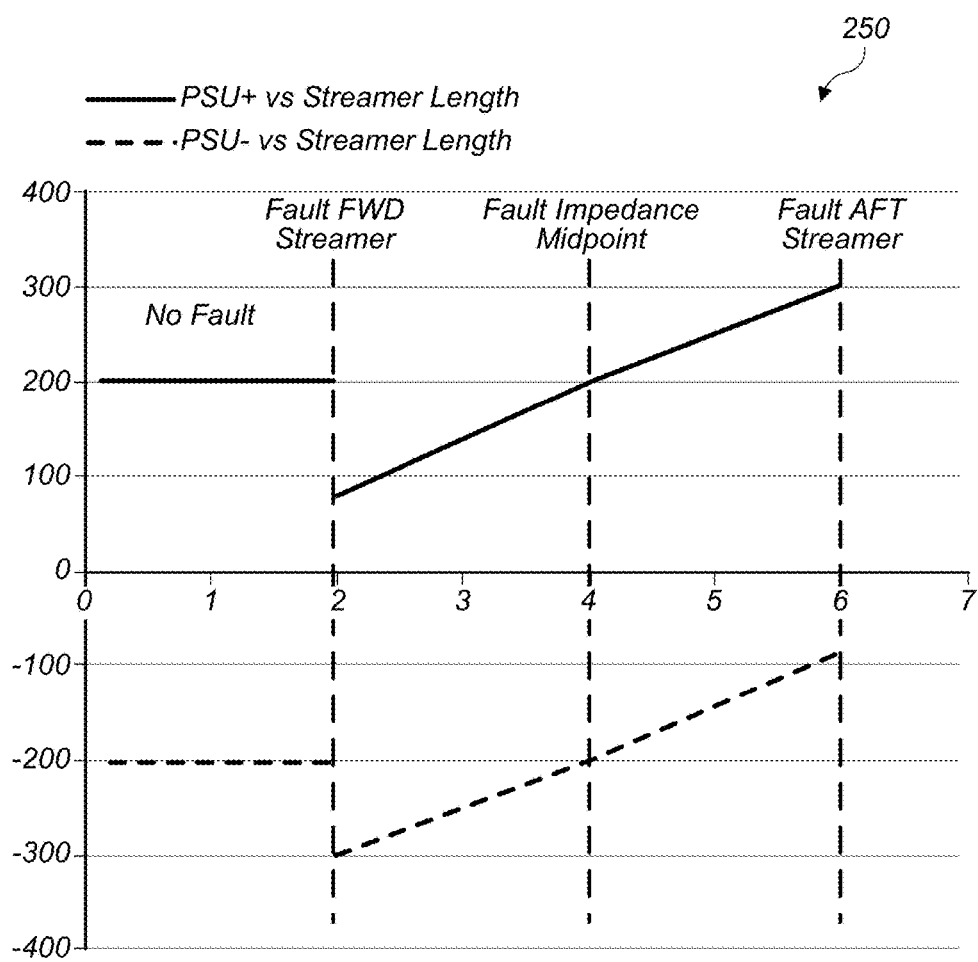
FIG. 13 shows a graph of voltage variation as a function of fault location.

As noted above, in some embodiments of this disclosure, an approximate location of an electrical fault may be determined or estimated. Turning now to FIG. 13, graph 250 is shown which indicates a PSU's voltage swing relative to ground, plotted as a function of fault location. In graph 250, an isolated constant-current PSU is assumed to power a plurality of series loads that are associated with an EM streamer. As shown, if a fault occurs toward the forward end of an EM streamer, a negative voltage swing occurs in both the PSU+ and PSU− rails. If the fault occurs toward the aft end of the EM streamer, a positive voltage swing occurs in both the PSU+ and PSU− rails. If the fault occurs at the midpoint of the streamer (that is, the resistive midpoint of the series of loads) then no voltage swing is observed. Accordingly, a position of the fault may be estimated by measuring the voltage swing of one or both rails relative to a ground reference. Further, the severity of the fault may be determined by measuring the difference between PSU+ and PSU−, where a larger fault current will cause a larger voltage sag (i.e., a smaller voltage between PSU+ and PSU−) to be measured. Alternatively or in addition, the severity of the fault may be determined by measuring the output power of the PSU, where a larger fault will correspond to a larger drop in output power.

Figure 14:
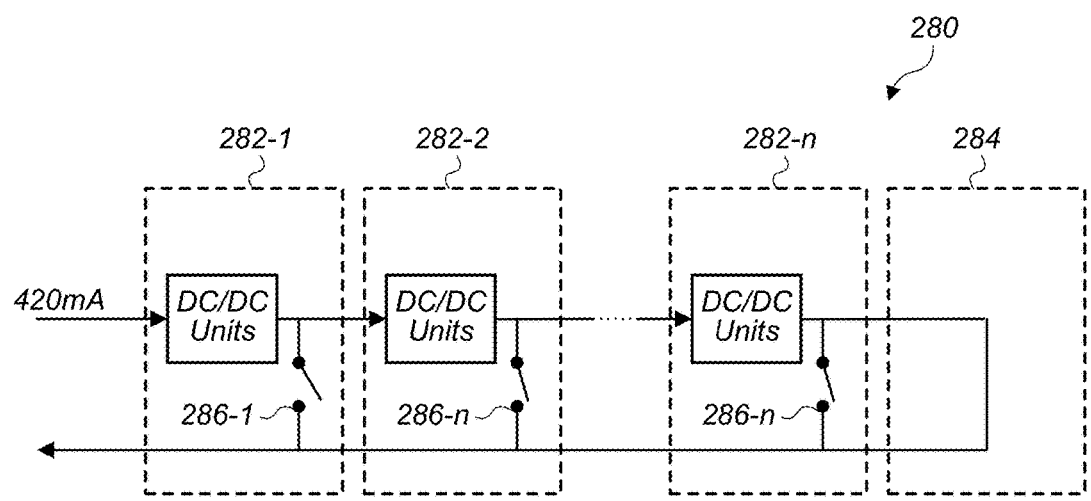
FIG. 14 shows an embodiment of an EM streamer power system.

Turning now to FIG. 14, a schematic of an embodiment of an EM streamer power system 280 is shown. System 280 is based on an isolated constant-current PSU (not shown). Initially, switches 286-1 through 286-n are all closed. Thus when power is first supplied to the EM streamer, module 282-1 is powered on. After powering up and performing diagnostics, module 282-1 opens switch 286-1, and power is supplied to module 282-2. This process continues down the line of modules, sequentially powering up each module through 282-n, and finally any other modules 284.

In one embodiment, the constant-current PSU supplies 420 mA. This may be used to power as many modules as desired. Taking into account the individual voltage drops of the modules as well as resistive losses, the nominal voltage of the constant-current PSU may be around 350V.

Figure 15:
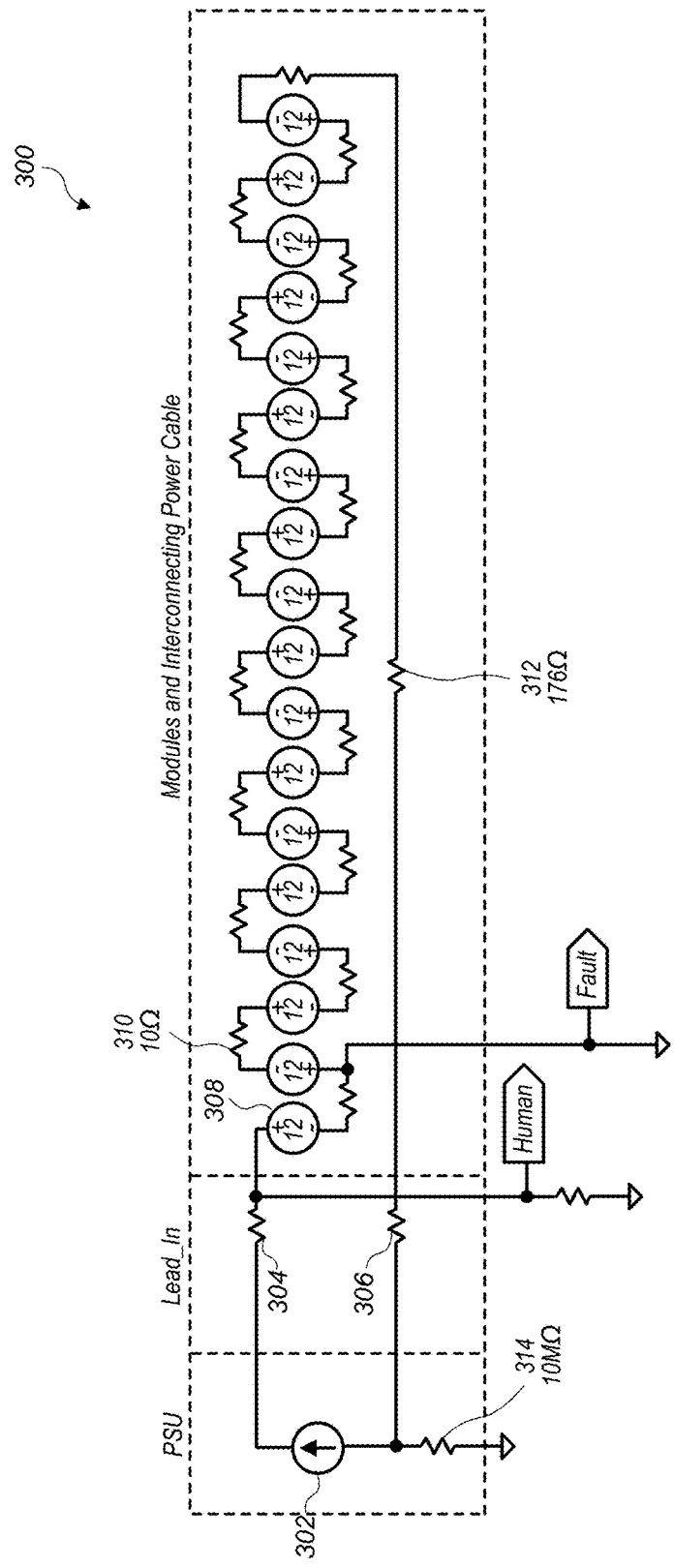
FIG. 15 shows a detailed embodiment of an EM streamer power system.

Turning now to FIG. 15, a more detailed schematic diagram of an embodiment of an EM streamer power system 300 is shown. Constant-current PSU 302 provides 420 mA of current via lead-in resistances 304 and 306 to a plurality of modules 308, which are arranged in series, and each of which accounts for a voltage drop of 12V. Constant-current PSU 302 is effectively isolated from ground, being coupled to ground only through resistor 314, which has a large resistance of 10 megohms. The connections between each of modules 308 also have an average resistance 310 of 10 ohms, and the return line resistance is represented at resistor 312 as 176 ohms. Taking all of these factors into account, the nominal output voltage of constant-current PSU 302 is approximately 380V.

In the example shown, a grounded person accidently touching a live part of the system will not receive an electric shock. This is because the power system is isolated from ground, and so current will not flow through the person. Electrocution can only occur if a ground fault occurs elsewhere in the system AND a person touches a live part of the system.

Various possibilities for the location of a ground fault and a person touching a live wire can be envisioned. For example, as shown in FIG. 15, a ground fault might occur between the first and second modules 308. Further, a human might touch either the supply (PSU+) or return (PSU−) wire at the lead-in to the EM streamer.

In this case, touching the return (PSU−) wire after a fault has occurred after the first module will likely cause severe injury (if current is not removed quickly). If the fault occurs further along the streamer, the voltage will increase on PSU+, and will decrease by the same amount on PSU−. So if a fault occurs halfway down the streamer, approximately 130V will be present on both lead-in power lines.

Accordingly, the worst-case scenario is if a person touches an exposed live wire at the lead-in, and a fault occurs either after the first module, or the last module. In such a case, there is a possibility of approximately 260V on either PSU+ or PSU−, hence 260 mA through a 1 k ohm human.

Referring back to FIG. 2, this means that power must be disconnected within 150 milliseconds to ensure that no irreversible damage occurs. (This is a worst-case scenario, and much faster responses may be possible according to some embodiments.)

In view of all of the foregoing discussion, it can be seen that a traditional GFI cannot work sufficiently with an EM streamer that uses an isolated constant-current PSU to power loads in series. A solution according to some embodiments is to directly measure the voltage drop across the constant-current PSU output or the magnitude of the output power; either rail (PSU+ or PSU−) voltage may also be measured with respect to ground in order to estimate a position of a fault.

When an EM streamer is powered up and in steady state, a constant current and a constant voltage may be observed, assuming that the load is constant. Further, the output voltage is symmetrical (or approximately symmetrical) around ground. Because the PSU is in constant-current mode, if the load impedance increases (e.g., open circuit), the constant-current PSU voltage will also increase to maintain the same output current, and the output power will correspondingly increase. Similarly, if the load impedance decreases (e.g., a current path to ground is established), the constant-current PSU voltage will decrease to maintain the same output current, and the output power will correspondingly increase.

Any condition that may cause current to flow through either a human or a fault to ground will lower the impedance seen by the constant-current PSU, with the effect of lowering the output voltage and the output power of the constant-current PSU. Further, the output voltage symmetry relative to ground must change, unless the fault occurs at the exact impedance mid-point in the streamer. Even if the fault does occur at the midpoint, if current flows to ground, this condition may be detected by a drop in PSU voltage. Finally, an upper-limit voltage can also be set, so that the PSU will be powered down in the case of an open circuit.

Figure 16:
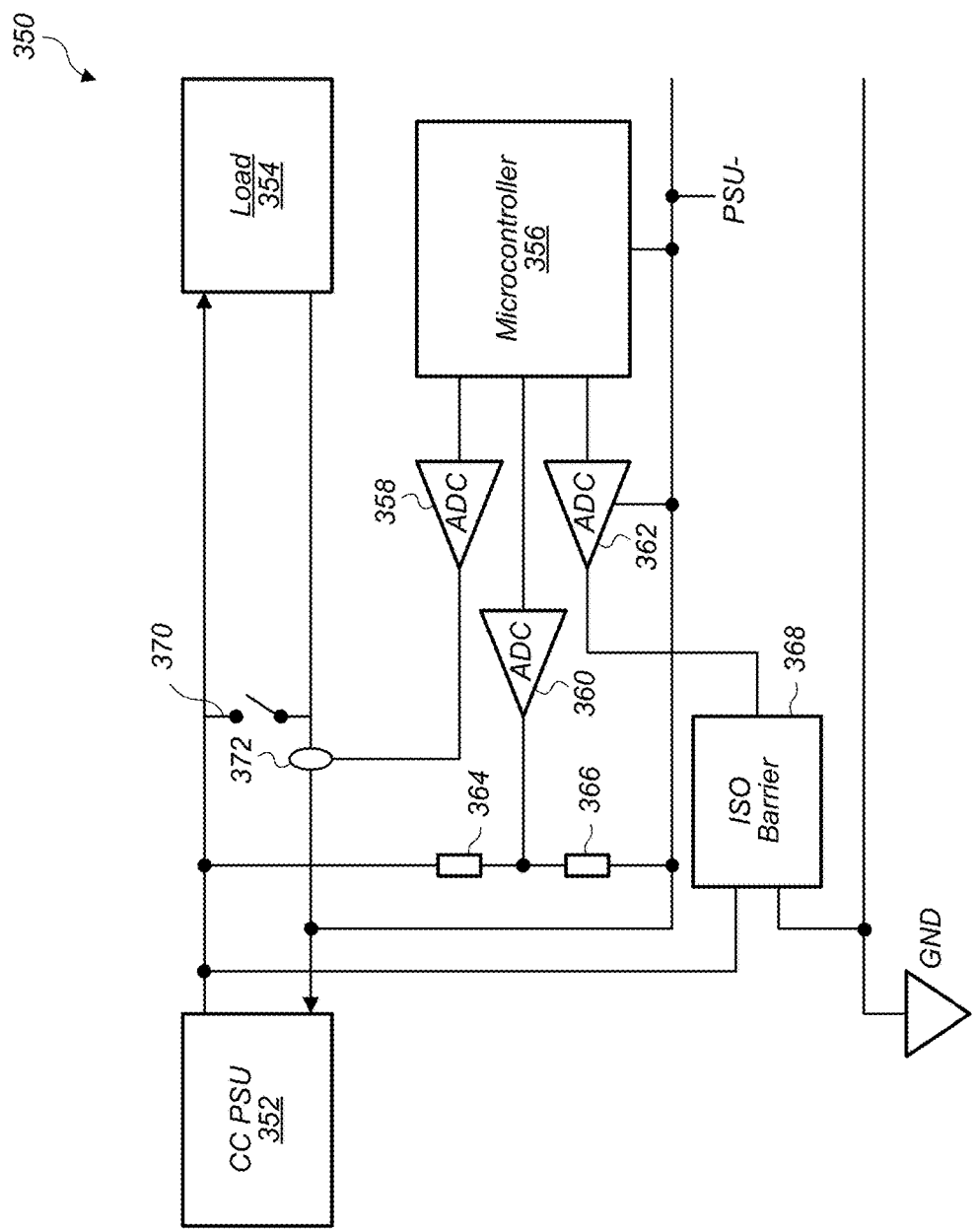
FIG. 16 shows an embodiment of a GFI.

Turning now to FIG. 16, an embodiment of GFI 350 is shown. As illustrated, constant-current PSU 352 supplies 400 mA to power load 354. GFI 350 may be implemented via the use of microcontroller 356 or any other desired type of control circuit, which may monitor various aspects of the system through analog-to-digital converters 358, 360, and 362.

In this embodiment, the electronics need not be referenced to ground, but may instead be referenced to the negative rail (PSU−) of constant-current PSU 352. In other embodiments, PSU− may be coupled to ground, but this may introduce undesirable noise into the system.

As shown, microcontroller 356 monitors the current output of constant-current PSU 352 via current sensor 372, coupled to analog-to-digital converter 358.

Microcontroller 356 also monitors the voltage across the rails of constant-current PSU 352 via resistors 364 and 366. If, for example, resistor 366 has a resistance 100 times the resistance of resistor 364, then analog-to-digital converter 360 would measure a voltage of approximately 99% of the total voltage across the rails of constant-current PSU 352. In other embodiments, microcontroller 356 may additionally or alternatively monitor the output power of PSU 352.

Finally, microcontroller 356 also monitors the voltage between one rail of constant-current PSU 352 and ground. In order to reduce noise, this measurement may be made via isolating circuit 368 (e.g., an optoisolator). For example, the voltage between the measured rail and ground may be used to drive a light-emitting diode (LED), and the light emitted by the LED may be measured via a photodiode or phototransistor, with an output coupled to analog-to-digital converter 362.

Microcontroller 356 may use all of the monitored data as described above to determine whether or not a fault has occurred, and whether to remove power by closing relay 370 (in other embodiments, some other type of switch may also be used as desired). Microcontroller 356 may also determine or estimate the location of the fault based on voltage swings of a PSU rail relative to a ground reference, as described above.

When relay 370 is closed, a short circuit is established, and all of the output of constant-current PSU 352 is diverted from load 354. In some embodiments, relay 370 may be a normally closed relay, such that microcontroller 356 must open relay 370 to allow load 354 to power up. It is noted that in various embodiments, relay 370 may be implemented according to any suitable technology, including mechanical and/or solid-state switching devices.

In other embodiments, different types of relay arrangements may be used, as one of ordinary skill in the art with the benefit of this disclosure will understand. For example, in one arrangement, relays may be used to connect both output rails of constant-current PSU 352 to ground. In a different arrangement, relays may be connected in series with one or both rails of constant-current PSU 352, such that when a fault is detected, the relays open.

In some embodiments, GFI 350 may be a standalone unit. In such cases, it may be advantageous to use wireless communications (e.g., WiFi or Bluetooth) to control GFI 350 and/or to receive fault reporting information from GFI 350. The use of a wireless interface for such communications may provide further isolation and noise reduction by ensuring that GFI 350 is not inadvertently referenced to ground via a wired link. In other embodiments, GFI 350 may be an integrated unit built into constant-current PSU 352.

Various parameters for the operation of GFI 350 may be stored, for example, in NVRAM of microcontroller 356. For example, output current, nominal output voltage, nominal output power, nominal voltage between a one or both rails and ground, etc. may be stored to provide reference values. If measured values stray too far away from reference values, then microcontroller 356 may close relay 370.

Figure 17:
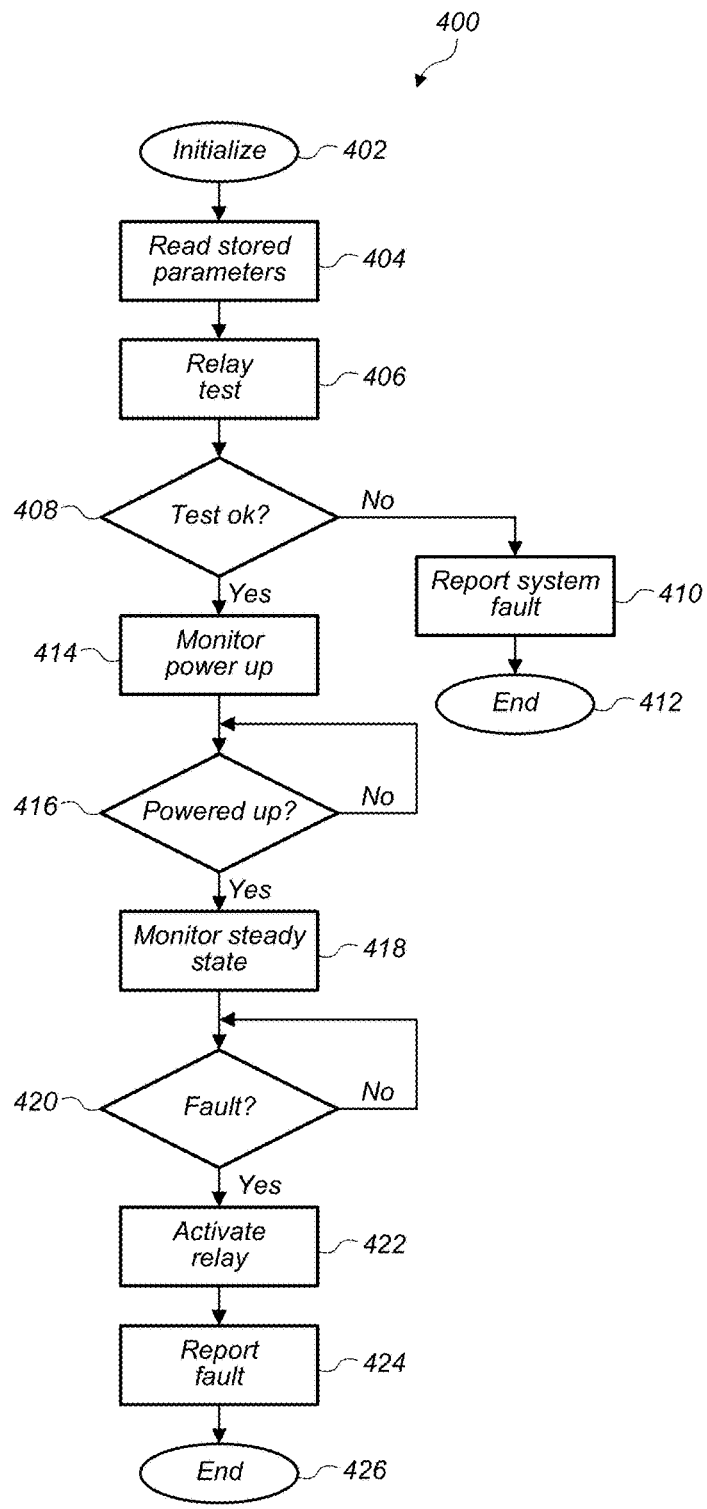
FIGS. 17-18 show flow diagrams of example methods.

Turning now to FIG. 17, an embodiment of a flow diagram 400 of the operation of GFI 350 is shown. Flow starts at step 402, in which microcontroller 356 is initialized. Stored parameters are then read at step 404.

A relay test is performed at step 406. For example, relay 370 may be opened and closed. If the relay operates correctly, the relay may then stay open, allowing power to flow to load 354. If the relay test fails at step 408, then a system fault is reported at step 410, and flow ends at step 412.

If the relay test passes, the power-up procedure is monitored at steps 414 and 416. For example, the system may initially detect 0 volts and 0 amps, and then detect a rising voltage and rising current up to some nominal voltage and nominal current. Once the unit is powered up, the GFI is considered "armed" and ready to interrupt power, and steady state operation is monitored at steps 418 and 420 until a fault occurs. If and when a fault occurs, the relay is activated at step 422. For example, a fault may be detected based on the PSU voltage and/or power falling below a threshold, and/or a voltage swing relative to ground being detected, and/or the PSU voltage rising above a threshold. In some instances, a fault is detected based on a voltage or power fluctuation lasting more than a selected length of time, such as 100 milliseconds, 200 milliseconds, 300 milliseconds, 400 milliseconds, 500 milliseconds, etc. Thus a fault may be detected based on the magnitude and duration of an unexpected change in output. In some embodiments, the selected length of time may be adjustable by a user. In some embodiments, the selected length of time may be selected as a function of the magnitude of the fault—for example, smaller voltage/power fluctuations may be considered tolerable for longer time periods than larger fluctuations. In some embodiments, a fault is detected based on a voltage or power fluctuation being larger than a specified magnitude, such as 30 volts and/or 15 watts for example. In some instances, the selected length of time is a variable that depends upon the magnitude of the voltage or power fluctuation.

The fault is reported at step 424 (e.g., via a wireless link), and in some embodiments additional data is also reported. For example, the type of fault and/or an estimated location of the fault based on voltage swings relative to ground may be included in the fault report. Finally, flow ends at step 426.

Figure 18:
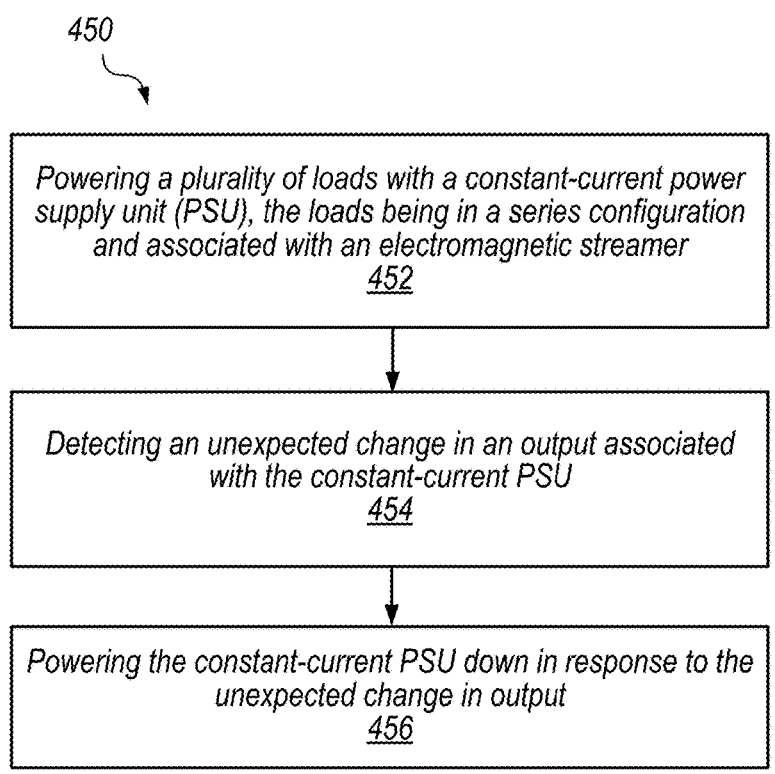

Turning now to FIG. 18, another embodiment of a flow diagram 450 is shown. At step 452, a plurality of loads are powered by a constant-current PSU. The loads are in a series configuration and are associated with an EM streamer. For example, the loads may be various modules of the streamer, such as sensors, birds, etc. Flow proceeds to step 454.

At step 454, an unexpected change in an output associated with the constant-current PSU is detected. For example, an unexpected drop in the voltage between the two rails of the PSU may be detected, or an unexpected drop in the power output of the PSU may be detected. Alternatively or in addition, an unexpected change in the voltage of one rail (or both rails) relative to a ground reference may also be detected. (Expected changes, as compared to unexpected changes, might correspond to events like powering up or powering down, or a normal change in power draw in a load.) Flow proceeds to step 456.

At step 456, the constant-current PSU is powered down in response to the unexpected change in output. For example, in some instances a relay may be closed that will remove power from the plurality of loads. Flow ends at step 456.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 19:
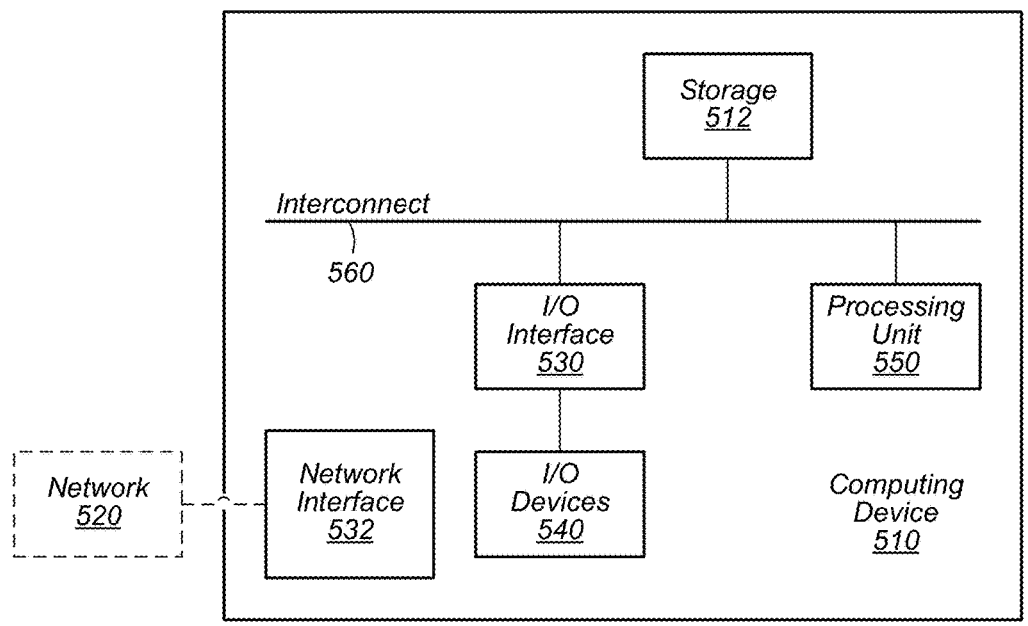
FIG. 19 shows a block diagram illustrating an example computing system.

Turning now to FIG. 19, a block diagram of a computing device (which may also be referred to as a computing system) 510 is depicted, according to some embodiments. Computing device 510 may be used to implement various portions of this disclosure. Computing device 510 is one example of a device that may be used as a mobile device, a server computing system, a client computing system, or any other computing system implementing portions of this disclosure. It is noted that the illustrated configuration is merely one possibility among many different general-purpose computing system architectures. Numerous variations of the illustrated configuration that omit some components, add others, and/or differently interconnect the various system components may be employed without loss of generality.

Computing device 510 may be any suitable type of device, including, but not limited to, a personal computer system, desktop computer, laptop or notebook computer, mobile phone, mainframe computer system, web server, workstation, or network computer. As shown, computing device 510 includes processing unit 550, storage subsystem 512, input/output (I/O) interface 530 coupled via interconnect 560 (e.g., a system bus). I/O interface 530 may be coupled to one or more I/O devices 540. Computing device 510 further includes network interface 532, which may be coupled to network 520 for communications with, for example, other computing devices.

As described above, processing unit 550 includes one or more processors. In some embodiments, processing unit 550 includes one or more coprocessor units. In some embodiments, multiple instances of processing unit 550 may be coupled to interconnect 560. Processing unit 550 (or each processor within processing unit 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

As used herein, the terms "processor," "processing unit," or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 512 may consist solely of volatile memory in some embodiments. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In some embodiments, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. As one example, a "control circuit" that is "configured to detect an unexpected change in a voltage" is intended to cover, for example, a mechanism that performs this function during operation, even if the mechanism in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, Applicant will recite claim elements using the "means for [performing a function]" construct.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a control circuit configured to be coupled to a constant-current power supply unit (PSU) that is operable to supply power to a plurality of loads that are in a series configuration;
wherein the control circuit is configured to:
detect an unexpected change in an output associated with the constant-current PSU; and
power down the constant-current PSU based on a magnitude and a duration of the unexpected change in output;
wherein the control circuit comprises a microcontroller configured to:
monitor a current output by the constant-current PSU via a current sensor coupled to an analog-to-digital controller;
monitor a voltage across a first and second rail of the constant-current PSU via respective first and second resistors; and
monitor, via an isolating circuit, a voltage between a given one of the first and second rails and ground.

2. The system of claim 1, wherein the plurality of loads are coupled to an electromagnetic streamer.

3. The system of claim 1, wherein the control circuit is integrated with the constant-current PSU.

4. The system of claim 1, wherein the control circuit is configured to power down the constant-current PSU in response to the magnitude of the unexpected change in output being a voltage change of at least 30 volts and the duration of the unexpected change in output being at least 100 milliseconds.

5. An apparatus, comprising:
a control circuit coupleable to a constant-current power supply unit (PSU) that is operable to supply power to a plurality of loads that are coupled in a series configuration between a first rail and a second rail of the constant-current PSU; and
a resistor divider network coupleable between the first rail and the second rail;
wherein the control circuit is configured to:
determine a first voltage between the first rail and a selected portion of the resistor divider network;
determine a second voltage between the first rail and ground; and
based on an unexpected change in at least one of the first and second voltages, cause the constant-current PSU to stop supplying power to the plurality of loads.

6. The apparatus of claim 5, wherein the control circuit is further configured to estimate a location of an electrical fault based on the unexpected change.

7. The apparatus of claim 6, wherein the constant-current PSU is coupled to power a plurality of series loads that are associated with an electromagnetic streamer, and wherein to estimate the location of the electrical fault, the control circuit is further configured to:
indicate that the location is estimated to be toward an aft end of the electromagnetic streamer in response to detecting a positive voltage swing in both the first and second rails relative to a ground reference;
indicate that the location is estimated to be toward a forward end of the electromagnetic streamer in response to detecting a negative voltage swing in both the first and second rails relative to the ground reference;
indicate that the location is estimated to be toward a midpoint of the electromagnetic streamer in response to detecting no voltage swing in both the first and second rails relative to the ground reference.

8. The apparatus of claim 5, wherein the control circuit is further configured to indicate a severity of an electrical fault dependent on measuring a voltage difference between the first and second rail or on measuring an output power of the constant-current PSU.

9. The apparatus of claim 5, wherein the plurality of loads comprises a plurality of modules, wherein each of the plurality of modules includes a respective switch coupled across the first and second rails, wherein each respective switch of the plurality of modules is initially closed before power is applied, wherein each of the plurality of modules is configured to open its respective switch after powering up and performing diagnostics, such that upon application of power to a first one of the plurality of modules, the plurality of modules powers up sequentially.

10. The apparatus of claim 5, wherein the unexpected change is detected in response to a human contact with the constant-current PSU or the plurality of loads.

11. The apparatus of claim 5, further comprising an isolating circuit coupled between the first rail and ground, wherein the control circuit is configured to measure the second voltage based on the isolating circuit.

12. The apparatus of claim 11, wherein the isolating circuit is an optoisolator.

13. The apparatus of claim 5, wherein the control circuit is configured to cause the constant-current PSU to stop supplying power to the plurality of loads by closing a switch that is in a parallel configuration with the plurality of loads.

14. The apparatus of claim 5, wherein the control circuit is configured to measure the first and second voltages via at least one analog-to-digital converter.

15. The apparatus of claim 5, wherein the apparatus is controllable via a wireless interface.

16. The apparatus of claim 15, wherein the control circuit is configured to report a fault condition via the wireless interface in response to the unexpected change.

17. A method, comprising:
performing, by a control circuit:
monitoring a first voltage across a first and second rail of a constant-current power supply unit (PSU) via respective first and second resistors;
monitoring, via an isolating circuit, a second voltage between a given one of the first and second rails and ground; and
based on an unexpected change in at least one of the first and second voltages, causing the constant-current PSU to stop supplying power to a plurality of loads.

18. The method of claim 17, wherein causing the constant-current PSU to stop supplying power is further based on a magnitude and a duration of the unexpected change in at least one of the first and second voltages.

19. The method of claim 18, wherein causing the constant-current PSU to stop supplying power is further based on the magnitude of the unexpected change being a voltage change of at least 30 volts and the duration of the unexpected change being at least 100 milliseconds.

20. The method of claim 17, further comprising:
performing, by the control circuit:
estimating a location of an electrical fault based on the unexpected change.

21. The method of claim 20, wherein the constant-current PSU is coupled to power a plurality of series loads that are associated with an electromagnetic streamer, and wherein estimating the location of the electrical fault comprises:

indicating that the location is estimated to be toward an aft end of the electromagnetic streamer in response to detecting a positive voltage swing in both the first and second rails relative to a ground reference.

22. The method of claim 20, wherein the constant-current PSU is coupled to power a plurality of series loads that are associated with an electromagnetic streamer, and wherein estimating the location of the electrical fault comprises:

indicating that the location is estimated to be toward a forward end of the electromagnetic streamer in response to detecting a negative voltage swing in both the first and second rails relative to a ground reference.

23. The method of claim 20, wherein the constant-current PSU is coupled to power a plurality of series loads that are associated with an electromagnetic streamer, and wherein estimating the location of the electrical fault comprises:

indicating that the location is estimated to be toward a midpoint of the electromagnetic streamer in response to detecting no voltage swing in both the first and second rails relative to a ground reference.

24. The method of claim 17, further comprising:

performing, by the control circuit:

indicating a severity of an electrical fault dependent on measuring a voltage difference between the first and second rail or on measuring an output power of the constant-current PSU.

25. The method of claim 17, wherein detecting the unexpected change occurs in response to a human contact with the constant-current PSU or the plurality of loads.

26. The method of claim 17, wherein causing the constant-current PSU to stop supplying power to the plurality of loads comprises closing a switch that is in a parallel configuration with the plurality of loads.

27. The method of claim 17, wherein measuring the first and second voltages occurs via at least one analog-to-digital converter.

28. The method of claim 17, wherein causing the constant-current PSU to stop supplying power to the plurality of loads comprises powering down the constant-current PSU.

* * * * *